US006293747B1

(12) United States Patent
Thomas

(10) Patent No.: US 6,293,747 B1
(45) Date of Patent: Sep. 25, 2001

(54) STRADDLE CARRIER WITH SLAB AND COIL TONGS

(75) Inventor: Dennis R. Thomas, Peoria, IL (US)

(73) Assignee: Kress Corporation, Brimfield, IL (US)

( * ) Notice: Subject to any disclaimer, the term of this patent is extended or adjusted under 35 U.S.C. 154(b) by 0 days.

(21) Appl. No.: 09/674,967

(22) PCT Filed: May 6, 1999

(86) PCT No.: PCT/US99/09895

§ 371 Date: Nov. 15, 2000

§ 102(e) Date: Nov. 15, 2000

(87) PCT Pub. No.: WO99/56985

PCT Pub. Date: Nov. 11, 1999

Related U.S. Application Data

(60) Provisional application No. 60/084,570, filed on May 7, 1998.

(51) Int. Cl.[7] .......... B60P 3/00

(52) U.S. Cl. .......... 414/460; 414/911; 414/618; 212/326; 294/88; 294/106

(58) Field of Search .......... 414/458, 459, 414/460, 461, 911, 618; 294/88, 106; 212/326, 291, 327; 254/2 R

(56) References Cited

U.S. PATENT DOCUMENTS

| | | |
|---|---|---|
| 2,959,310 | 11/1960 | Meister . |
| 4,016,993 | 4/1977 | Tax et al. . |
| 4,286,915 | 9/1981 | LaBerdia . |
| 5,496,146 | 3/1996 | Thomas et al. . |

FOREIGN PATENT DOCUMENTS

| | | |
|---|---|---|
| 1 406 121 | 9/1975 | (GB) . |

*Primary Examiner*—Frank E. Werner
(74) *Attorney, Agent, or Firm*—Leydig, Voit & Mayer, Ltd.

(57) ABSTRACT

A self-propelled, steerable straddle carrier (10) includes a main frame (12) supported on transport wheels (14) with a tong table (20) and a plurality of hydraulic lift actuator (34) for raising and lowering the tong table (20) relative to the main frame (12). A pair of front and rear slab tongs (42, 44) are pivotally mounted on the tong table (20) with a pair of front and rear pinch cylinders (43, 45) for opening and closing the slab tongs (42, 44). A pair of coil tongs (52) arm disposed between the front and rear slab tongs (42, 44) with a pair of inverted yoke assemblies for pivotally supporting the coil tongs (52) and a center pinch cylinder (60) for opening and closing the coil tongs (52). A pair of hydraulic actuators (34) interconnect the yoke assemblies and the main frame (12) for raising and lowering the coil tongs (52) relative to the slab tongs (42, 44) to permit the straddle carrier (10) to transport either stacks of steel slabs or a steel coil.

6 Claims, 4 Drawing Sheets

STRADDLE CARRIER WITH SLAB AND COIL TONGS

This application is a 371 of PCT/US99/09895 filed May 6, 1999, which claims the benefit of Provisional of 60/084,570 filed May 7, 1998.

FIELD OF THE INVENTION

The present invention relates generally to vehicles for handling and carrying heavy loads, and more particularly concerns an improved straddle carrier incorporating combined tongs for lifting, supporting and transporting both steel slabs and coils.

BACKGROUND OF THE INVENTION

U.S. Pat. Nos. 4,170,434, 4,488,848 and 4,601,630 to Kress et al., assigned to the same assignee as the present invention, disclose vehicles that handle heavy loads. Vehicles constructed in accordance with these patents have proven themselves in the field for reliably and efficiently handling the lifting and transporting of straddled loads consisting of steel slabs and billets on the order of 50–150 tons.

U.S. Pat. No. 5,496,146 to Thomas et al., and also assigned to the same assignee as the present invention, discloses a slab and coil carrier which employs tongs for lifting, supporting and transporting steel slabs and a separate probe assembly, disposed generally between the tongs, which may be moved from an inactive storage position to an operative position for penetrating the open center of large steel coils. The probe is also elevatable with the tong supporting mechanism such that the probe can lift, support and transport the steel coils from place to place.

SUMMARY AND OBJECTS OF THE INVENTION

It is an object of the present invention to provide an improved straddle type carrier with combined tongs for lifting, supporting and transporting both steel slabs and coils.

A further object is to provide such a straddle carrier with combined slab and coil tongs which are mounted on a common tong table that can be raised and lowered to pick up or set down the steel slabs or coil.

A more detailed object is to provide means for vertically displacing the slab and coil tongs relative to each other so as to locate one set of tongs in a substantially out of the way inactive position when the other set of tongs is operative for lifting, supporting and transporting a load of slabs or coil of steel.

These and other features and advantages of the invention will be more readily apparent upon reading the following description of a preferred exemplified embodiment of the invention and upon reference to the accompanying drawings.

While the invention will be described and disclosed in connection with certain preferred embodiments and procedures, it is not intended to limit the invention to those specific embodiments. Rather it is intended to cover all such alternative embodiments and modifications as fall within the spirit and scope of the invention.

DETAILED DESCRIPTION OF THE PREFERRED EMBODIMENT

Figure 1:
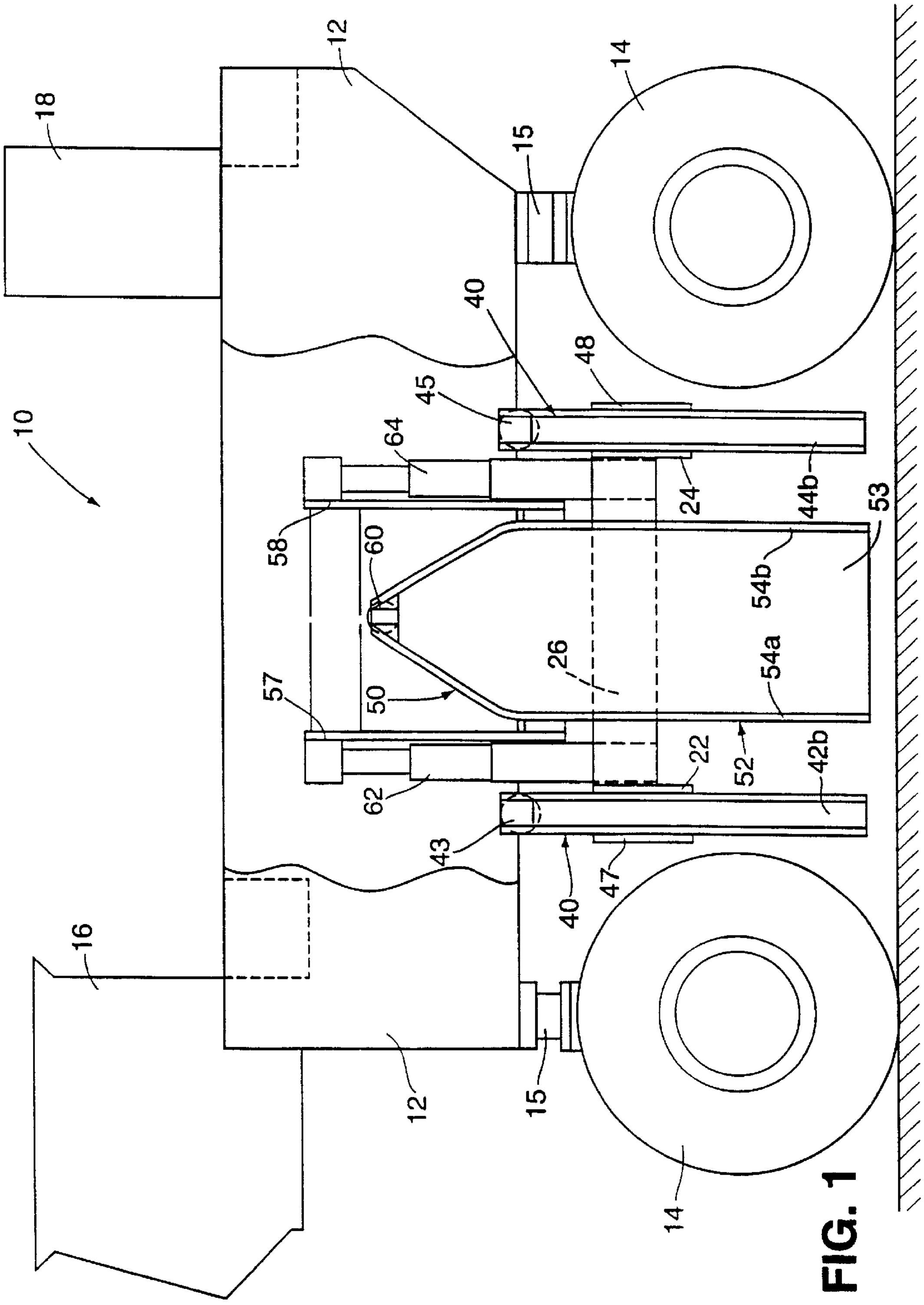
FIG. 1 is a somewhat schematic side elevational view of a straddle carrier incorporating the combined slab and coil carrying tongs of the present invention.

Turning now to the drawings in more detail, there is shown in FIG. 1 a side elevation of a straddle carrier 10 which incorporates the features of the present invention. The straddle carrier 10 has a generally rectangular main frame 12 supported adjacent the corners thereof by heavy duty ground engaging wheels 14. An operator's cab 16, shown schematically, is located at the forward end of the main frame 12 and an engine housing 18, also shown schematically, is supported at the top rear of the main frame 12. Preferably, each of the wheels 14 is self-propelled through a suitable hydraulic motor (not shown) driven by a pump (not shown) located in the engine housing 18. Each wheel 12 is also preferably steerable and supports the main frame 12 through a vertical pivot post 15 which may be rotated by suitable steering mechanism (not shown) through suitable controls located in the operator's cab 16.

Figure 2:
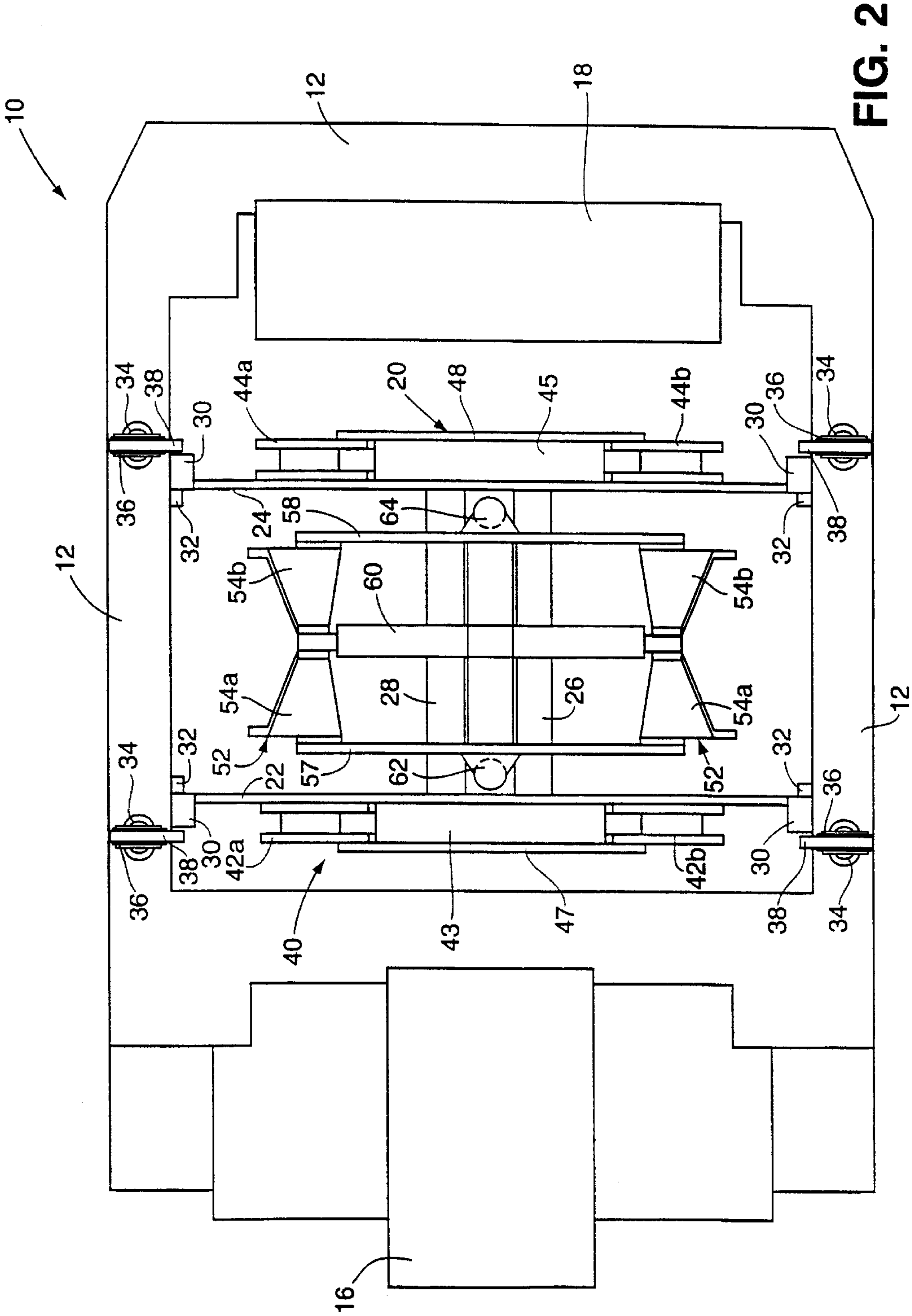
FIG. 2 is a schematic plan view of the straddle carrier shown in FIG. 1.

As shown in FIG. 2, the rectangular main frame 12 is generally open in the center to accommodate a vertically movable tong table 20, which in plan view, has a generally H-shaped configuration including front and rear transverse beams 22 and 24 interconnected by a pair of spaced-apart, box-likes, center beams 26 and 28. The laterally extending ends of the front and rear beams 22, 24 each carries a vertically disposed guide shoe 30 which moves up and down within the central opening of the main frame 12 adjacent to and guided by a respective guide rail 32 attached to the inside of the main frame 12.

Figure 3:
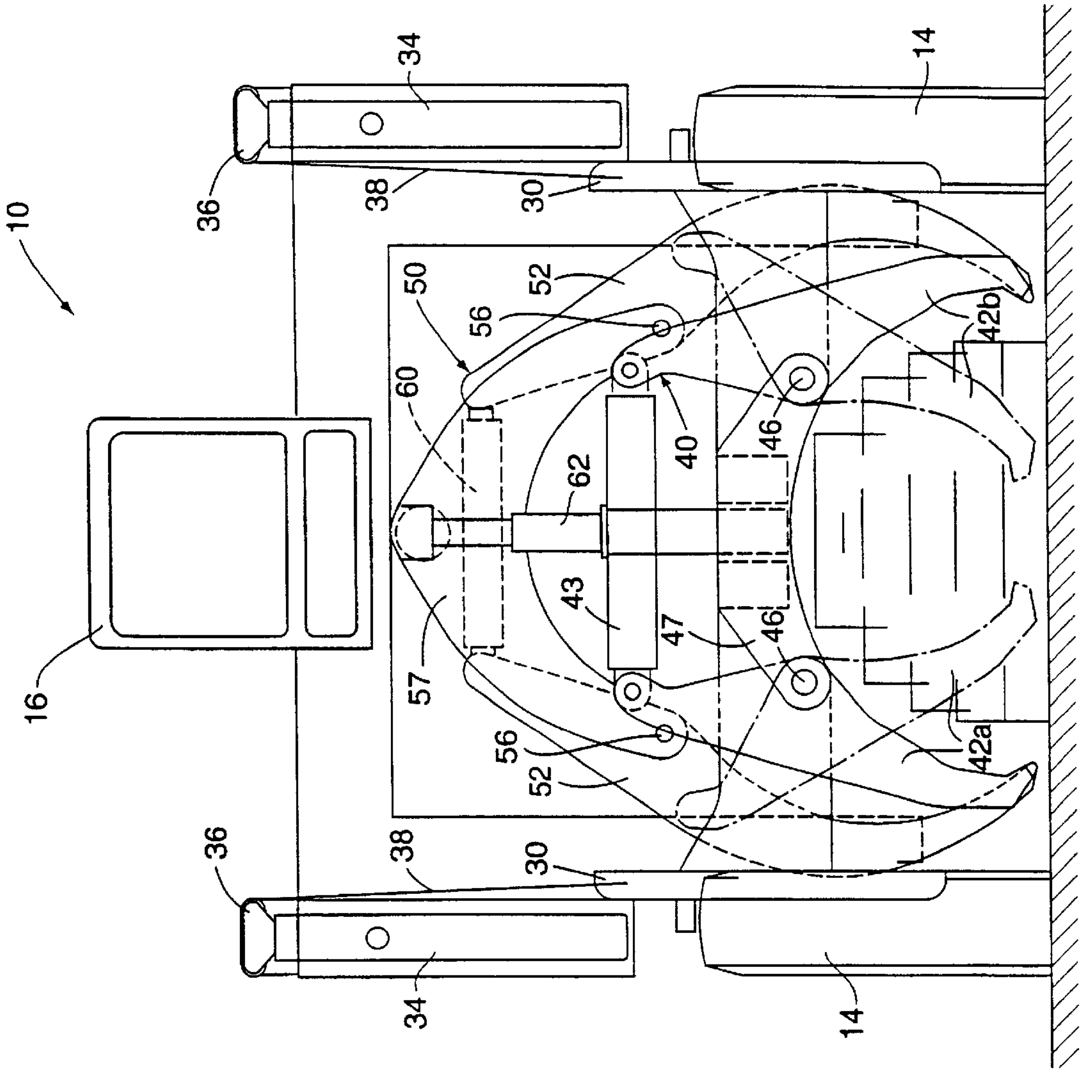
FIG. 3 is a front elevation of the straddle carrier shown in FIGS. 1 and 2 with the slab tongs lowered and shown in both open (solid line) and closed (broken line) positions while the coil tongs are shown in their open (solid line) position elevated with respect to the slab tongs; and, FIG. 4 is an elevational view, similar to FIG. 3, but showing in the lower portion thereof the coil tongs lowered and shown in both open (solid line) and closed (broken line) positions while the slab tongs are shown in their open (solid line) position elevated with respect to the coil tongs, and showing in the upper portion thereof the coil tongs supporting a steel coil for transport while the slab tongs are shown in an open inactive position.

To raise and lower the tong table 20, the main frame 12 carries a pair of hydraulic actuators 34 on either side thereof positioned adjacent the ends of the front and rear transverse beams 26 and 28. The upper end of each of the actuators 34 carries a pulley assembly 36 over which a suitable chain or cable, shown schematically at 38, is trained. One end of each cable 38, is secured to the main frame 12 and the other end of the cable is fastened to a respective one of the tong table guide shoes 30. When the actuators 34 are retracted, as shown in FIG. 3, the tong table 20 and guide shoes 30 are lowered within the central opening of the straddle carrier's main frame 12. When the actuators are extended, as shown in the upper portion of FIG. 4, the tong table and guide shoes are elevated to the upper load carrying and transport position.

In accordance with the present invention, the vertically elevatable tong table 20 of the straddle carrier 10 carries a slab-gripping tong assembly 40 for lifting supporting and transporting a stack of steel slabs or the like, and the tong table 20 also carries a coil-gripping tong assembly 50 for lifting, supporting and transporting a coil of sheet or strip steel. The slab tong assembly 40 includes front and rear pairs of slab tongs 42 and 44, with each pair of tongs including left and right tong fingers 42*a*, 42*b* and 44*a*, 44*b* pivotally mounted on pins 46 carried by front and rear support plates 47 and 48 spaced outwardly from the tong table transverse beams 22 and 24 and secured to the tong table center beams 26 and 28. A pair of front and rear hydraulic pinch cylinders 43 and 45 interconnect the upper ends of the left and right tong fingers 42*a*, 42*b* and 44*a*, 44*b* of each slab tong pair 42 and 44.

When the pinch cylinders 43 and 45 are retracted, as shown in FIG. 3, the lower end of the tong fingers 42*a*, 42*b* (and 44*a*, 44*b*) are open to the solid line position to receive or discharge a stack of steel slabs, shown diagrammatically at S. When the pinch cylinders 43, 45 are extended, the lower ends of the slab tong fingers 42*a*, 42*b* (and 44*a*, 44*b*) are pivoted toward the closed position, as shown in broken lines in FIG. 3. Of course, if the straddle carrier 10 is positioned to straddle a stack of steel slabs S, as shown diagrammatically in FIG. 3, the lower ends of the slab tong fingers 42*a*, 42*b* (and 44*a*, 44*b*) would close, engage and grip the steel slabs. Once the stack of steel slabs is gripped by the slab tongs 42 and 44, the hydraulic lift actuators 34 can be energized to elevate the tong table 20, the slab gripping tong assembly 40 and the stack of steel slabs S.

Pursuant to the invention, the coil gripping tong assembly 50 includes a pair of coil tongs 52 mounted between the front and rear pairs of slab tongs 42 and 44. Each of the coil tongs 52 includes a center web portion 53 reinforced by fore and aft edge flanges 54*a* and 54*b* which are pivotally mounted by pins 56 on the lower ends of a pair of front and rear yoke assemblies 57 and 58, each having a generally inverted U-shaped configuration. In the preferred embodiment, the upper ends of the coil tong flanges 54*a*, 54*b* are angled upwardly and inwardly toward the transverse center line of the straddle carrier 10. The upper ends of the right hand coil tong flanges 54*a* and 54*b* are connected together by a pin which also pivotally connects the right hand end of a center hydraulic pinch cylinder 60. Similarly, the upper ends of the left hand coil tong flanges 54*a* and 54*b* are pin connected together to the left hand end of the center hydraulic pinch cylinder 60.

In keeping with the invention, the front and rear coil tong supporting yokes 57, 58 are connected to the free ends of a pair of front and rear yoke elevating cylinders 62, 64 which have their base ends secured to the center box beams 26, 28 of the tong table 20. Preferably, the elevating cylinders 62, 64 are in the form of multiple stage hydraulic cylinders. When the yoke elevating cylinders 62, 64 are extended, as shown in FIG. 3, the coil tong assembly 50 is raised relative to the slab tong assembly 40. Also, when the center pinch cylinder 60 is retracted, as also shown in FIG. 3, the lower ends of the coil tongs 52 are pivoted to their open or inactive position. Thus, as seen in FIG. 3, the coil tongs 52 may be opened and elevated relative to the slab tong fingers 42, 44 so that the slab tong fingers are operative to grip and hold a stack of steel slabs S.

Figure 4:
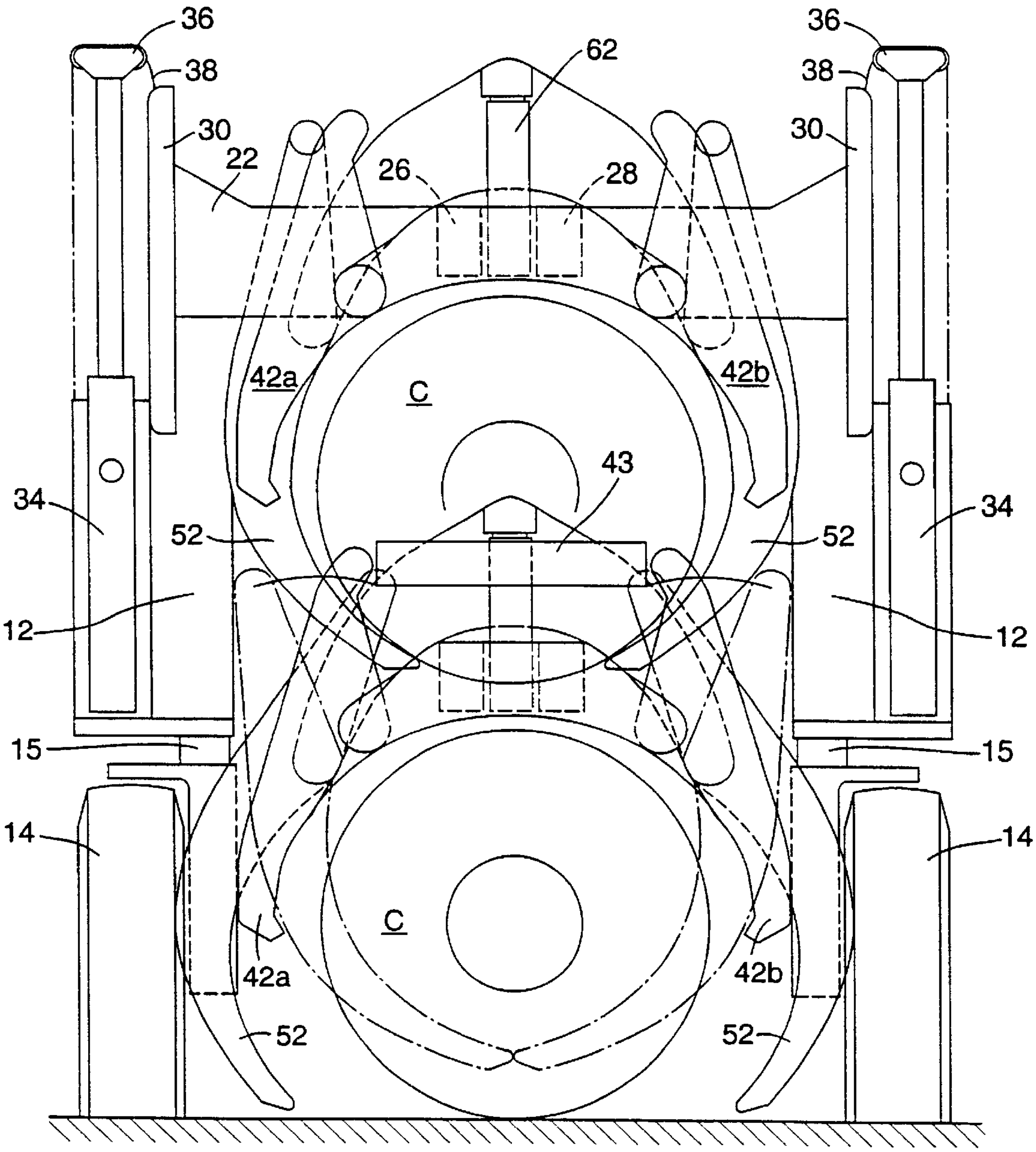

When it is desired to pick up and transport a coil C of strip steel or other metal, the straddle carrier 10 is positioned over the steel coil C, as shown diagrammatically in the lower portion of FIG. 4. To provide clearance for the coil C between the coil tongs 52, the yoke elevating cylinders 62, 64 are retracted which has the effect of raising the slab tong assembly 30 out of the way of the coil tong assembly 40. Thus, as seen in the lower portion of FIG. 4, the coil tongs 52 are lowered and opened to receive the coil C and the slab tong fingers 42*a*, 42*b* are opened and raised to provide clearance for the coil C.

To grip the coil C, the center pinch cylinder 60 is activated to close the coil tongs 52 around the coil C. If the coil is relatively small in diameter, the lower ends of the coil tongs 52 may be pivoted together to a closed (broken line) position with their ends together. To raise the coil C to transport position, the lift actuators 34 are extended which elevates the tong table 20 and the tong assemblies 40 and 50 and the coil C to the position shown in the upper portion of FIG. 4.

Thus it will be seen that a novel and improved straddle carrier with combined slab and coil tongs has been provided which attains the aforementioned objects. By nesting the coil tong assembly 50 between the front and rear pairs of slab tongs 42, 44 and by pivoting the coil tongs on elevatable yokes supported on extendable and retractable hydraulic actuators, the slab tongs 42, 44 and the coil tongs 52 may be raised and lowered relative to one another to position one tong assembly out of the way while the other tong assembly is operative to grip, support and transport its respective load, Various additional modifications of the embodiments specifically illustrated and described herein will be apparent to those skilled in the art, particularly in light of the teachings of this invention. The invention should not be construed as limited to the specific form shown and described, but instead is set forth in the following claims.

What is claimed is:

1. A self-propelled, steerable straddle carrier comprising, in combination, a main frame supported on transport wheels, a tong table, a plurality of hydraulic lift actuators for raising and lowering the tong table relative to the main frame, pairs of front and rear slab tongs pivotally mounted respectively on the front and rear of tong table, front and rear pinch cylinders for opening and closing the front and rear slab tongs, a pair of coil tongs disposed between the front and rear slab tongs, a pair of inverted yoke assemblies for pivotally supporting the coil tongs, a center pinch cylinder for opening and closing the coil tongs, and a pair of actuators interconnecting the yoke assemblies and the tong table for raising and lowering the coil tongs relative to the slab tongs and the tong table.

2. A straddle carrier as defined in claim 1 wherein the center pinch cylinder is operable for opening lower ends of the coil tongs substantially equal to the maximum opening between the lower ends of the slab tongs when the front and rear pinch cylinders are retracted.

3. A straddle carrier as defined in claim 2 wherein the hydraulic lift actuators are operable for raising the tong table, the slab tongs and the coil tongs so as to lift a stock of metal slabs to transport position.

4. A straddle carrier as defined in claim 1 wherein the hydraulic lift actuators are operable for raising the tong table and the opened slab tongs a substantial distance above the ground while lower ends of the opened coil tongs are positioned substantially in engagement with the ground so as to form a tunnel-like opening for receiving a large coil of metal.

5. A straddle carrier as defined in claim 4 wherein the center pinch cylinder is operable for closing the lower ends of the coil tongs to substantially encircle a large coil of metal.

6. A straddle carrier as defined in claim 5 wherein the hydraulic lift actuators are operable for raising the tong table, the slab tongs and the coil tongs so as to lift the metal coil to transport position.

* * * * *